(12) United States Patent
Sun et al.

(10) Patent No.: US 7,965,111 B2
(45) Date of Patent: Jun. 21, 2011

(54) METHOD AND APPARATUS FOR DIVIDER UNIT SYNCHRONIZATION

(75) Inventors: Bo Sun, Carlsbad, CA (US); Sankaran Aniruddhan, San Diego, CA (US); Sriramgopal Sridhara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/111,561

(22) Filed: Apr. 29, 2008

(65) Prior Publication Data

US 2009/0267657 A1    Oct. 29, 2009

(51) Int. Cl.
*H03L 7/00* (2006.01)
(52) U.S. Cl. .......................................... 327/141; 327/144
(58) Field of Classification Search ........... 327/141–145
See application file for complete search history.

(56) References Cited

U.S. PATENT DOCUMENTS

| | | | |
|---|---|---|---|
| 5,349,255 A | * | 9/1994 | Patel ............................... 327/141 |
| 6,118,314 A | * | 9/2000 | Arnould et al. ................ 327/141 |
| 6,640,310 B2 | | 10/2003 | Jensen et al. |
| 7,042,263 B1 | | 5/2006 | Johnson et al. |
| 2005/0184773 A1 | | 8/2005 | Boyko et al. |

OTHER PUBLICATIONS

International Search Report—PCT/US09/042109, International Searching Authority—US, Sep. 7, 2009.

* cited by examiner

*Primary Examiner* — Lincoln Donovan
*Assistant Examiner* — Diana J Cheng
(74) *Attorney, Agent, or Firm* — Eric Ho

(57) ABSTRACT

A method an apparatus for synchronizing phases of one or more divider units comprise powering on a master divider unit to provide a reference signal. A phase of a slave divider unit is synchronized to the reference signal from the master divider unit by providing a power on pulse at the slave divider unit, synchronizing the phase of the slave divider unit to the reference signal using a digitally controlled oscillator, and powering on the slave divider unit after a first predetermined delay period following a rising edge of the power on pulse. By synchronizing a slave divider unit to the reference signal from the master divider unit, any number of slave divider units may be powered on and in-phase with each other.

32 Claims, 7 Drawing Sheets

METHOD AND APPARATUS FOR DIVIDER UNIT SYNCHRONIZATION

BACKGROUND

1. Field

The present disclosure relates generally to clock synchronization, and more specifically to low-power synchronization of divider unit phases.

2. Background

Digital circuits use clocking signals for a variety of reasons. For example, synchronous systems use global clock signals to synchronize various circuits across a board or IC device.

Most systems use one clock generating circuit to generate a first clock signal and a specialized circuit to derive other clock signals from the first clock signal. For example, clock dividers are used to generate one or more clock signals of lower clock frequencies from an input clock signal.

For example, a transmitter up-converter Local Oscillator (LO) divider, which is based on a thermometer type unit-based design may be utilized. This unit-based divider provides excellent LO leakage and gain control step, as well as excellent LO power consumption for low output power. Such a divider with excellent LO power consumption is increasingly desirable, especially in polar transmitters that are becoming more common for various modulation systems. However, the phases of the divider units therein are not synchronized, and the up-converter output power is not constant at every power up.

In an up-converter divider, with two divider units for example, in-phase power (i.e., amplitude from the up-converter output) may be 6 dB higher. Three divider units may provide a 9.5 dB higher amplitude. However, as phases of the divider units become unsynchronized, these heightened power amplitudes decrease. In fact, if two divider units are 180 degrees out of phase, their output powers will be cancelled out completely.

According to conventional Code Division Multiple Access (CDMA) systems, transmission power of a handset close-loop is controlled with a base station. If the requisite transmission power of handset is unpredictable, the power decisions from the base station will be inaccurate or nonfunctional.

SUMMARY

The presently disclosed embodiments are directed to solving one or more of the problems presented in the prior art, described above, as well as providing additional features that will become readily apparent by reference to the following detailed description when taken in conjunction with the accompanying drawings.

One aspect of the disclosure is directed to a method for synchronizing phases of one or more divider units. The method comprises powering on a master divider unit to provide a reference signal; and synchronizing the phase of a slave divider unit to the reference signal from the master divider unit.

Another aspect of the disclosure is directed to an apparatus for synchronizing phases of one or more divider units. The apparatus comprises a master divider unit providing a reference signal; and a slave divider unit synchronizing a phase thereof to the reference signal from the master divider unit.

Yet another aspect of the disclosure is directed to an apparatus for synchronizing phases of one or more divider units. The apparatus comprises means for providing a reference signal from a master divider unit; and a means for synchronizing a phase of a slave divider unit to the reference signal from the master divider unit.

Yet another aspect of the disclosure is directed to a computer-readable medium storing instructions thereon for performing a method of synchronizing phases of one or more divider units. The method comprises powering on a master divider unit to provide a reference signal; and synchronizing a phase of a slave divider unit to the reference signal from the master divider unit.

According to certain aspects, the synchronizing is performed by providing a power on pulse at the slave divider unit; synchronizing the phase of the slave divider unit to the reference signal using a digitally controlled oscillator; and powering on the slave divider unit after a first predetermined delay period following a rising edge of the power on pulse.

By synchronizing a slave divider unit to the reference signal from the master divider unit, any number of slave divider units may be powered on and in phase with each other.

It is to be understood that both the foregoing general description and the following detailed description are exemplary and are intended to provide further explanation of the claimed subject matter.

BRIEF DESCRIPTION OF THE DRAWINGS

The features, nature and advantages of the present disclosure will become more apparent from the detailed description set forth below when taken in conjunction with the drawings in which like reference characters identify correspondingly throughout and wherein.

DETAILED DESCRIPTION

Figure 1:
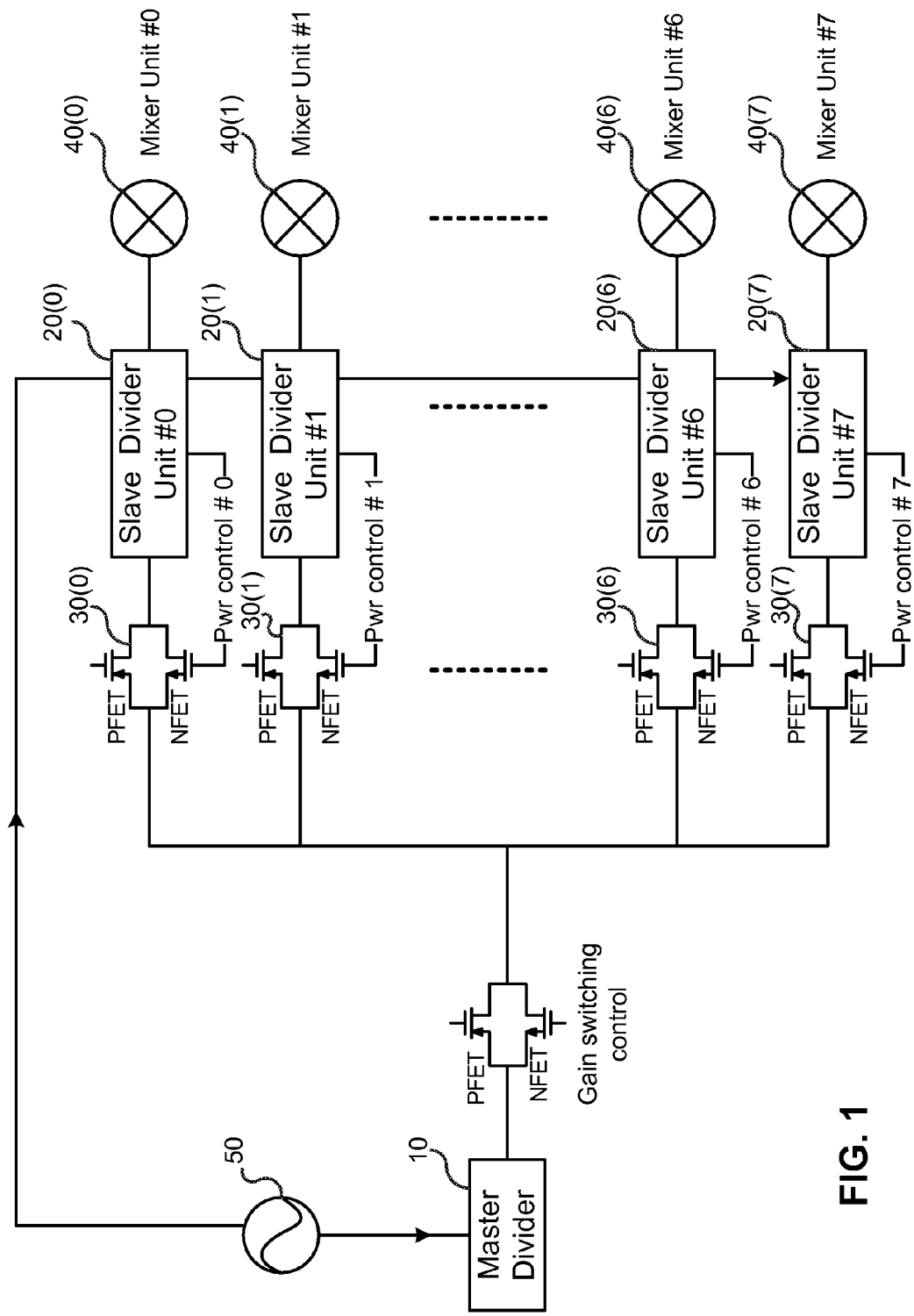
FIG. 1 is a schematic of a divider unit synchronization scheme using a master divider unit and a plurality of slave divider units, according to certain aspects of the present disclosure.

In the following detailed description, numerous specific details are set forth to provide a full understanding of the subject technology. It will be obvious, however, to one ordinarily skilled in the art that the subject technology may be practiced without some of these specific details. In other instances, well-known structures and techniques have not been shown in details so as not to obscure the subject technology.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

FIG. 1 is a schematic of a divider unit synchronization scheme using a master divider unit and a plurality of slave divider units, according to certain aspects of the present disclosure. In this exemplary schematic, slave divider units 20(0)-20(7) are shown; however, the present disclosure is not limited to any particular number of slave divider units. According to certain aspects, a master divider 10 outputs a reference signal (not shown) to each slave divider unit 20(0)-20(7), respectively. The master divider 10 need not be a high performance divider with excellent phase noise. The master divider 10 may be, for example, any conventional low-power divider to save power while providing a master clock phase. Further, one of ordinary skill in the art would understand that one of the slave divider units 20(0)-20(7) may act as the master divider 10 and generate a reference signal to be sent to each slave divider unit 20(0)-20(7).

Respective power controls 30(0)-30(7) of slave divider units 20(0)-20(7) are powered on to operate the slave divider units 20(0)-20(7) until the phases of the slave divider units 20(0)-20(7) are synchronized to the reference signal output from the master divider 10. As will be discussed in further detail with reference to FIGS. 5 and 6, an oscillating signal from a digitally (or voltage) controlled oscillator (DCO) 50 is input to each slave divider unit 20(0)-20(7) and is used by the by slave divider units 20(0)-20(7) to synchronize their respective phases to the reference signal.

After a respective slave divider unit 20(0)-20(7) is synchronized to the reference signal from the master divider 10, the respective slave divider unit 20(0)-20(7) is delay powered on using its respective power control 30(0)-30(7). Thereafter, the master divider 10 may be turned to a low-power state to save power. The synchronized slave divider unit(s) 20(0)-20(7) may then, for example, output a generated clock signal to a respective mixer unit 40(0)-40(7). Of course, the generated clock signals may be used for various applications, and the present disclosure is not limited to any particular use.

Since each powered-on slave divider unit 20(0)-20(7) is synchronized (i.e., in phase) with the constant reference signal generated by the master divider 10, it follows that each slave divider unit 20(0)-20(7) will be in phase with each other as well.

Figure 2:
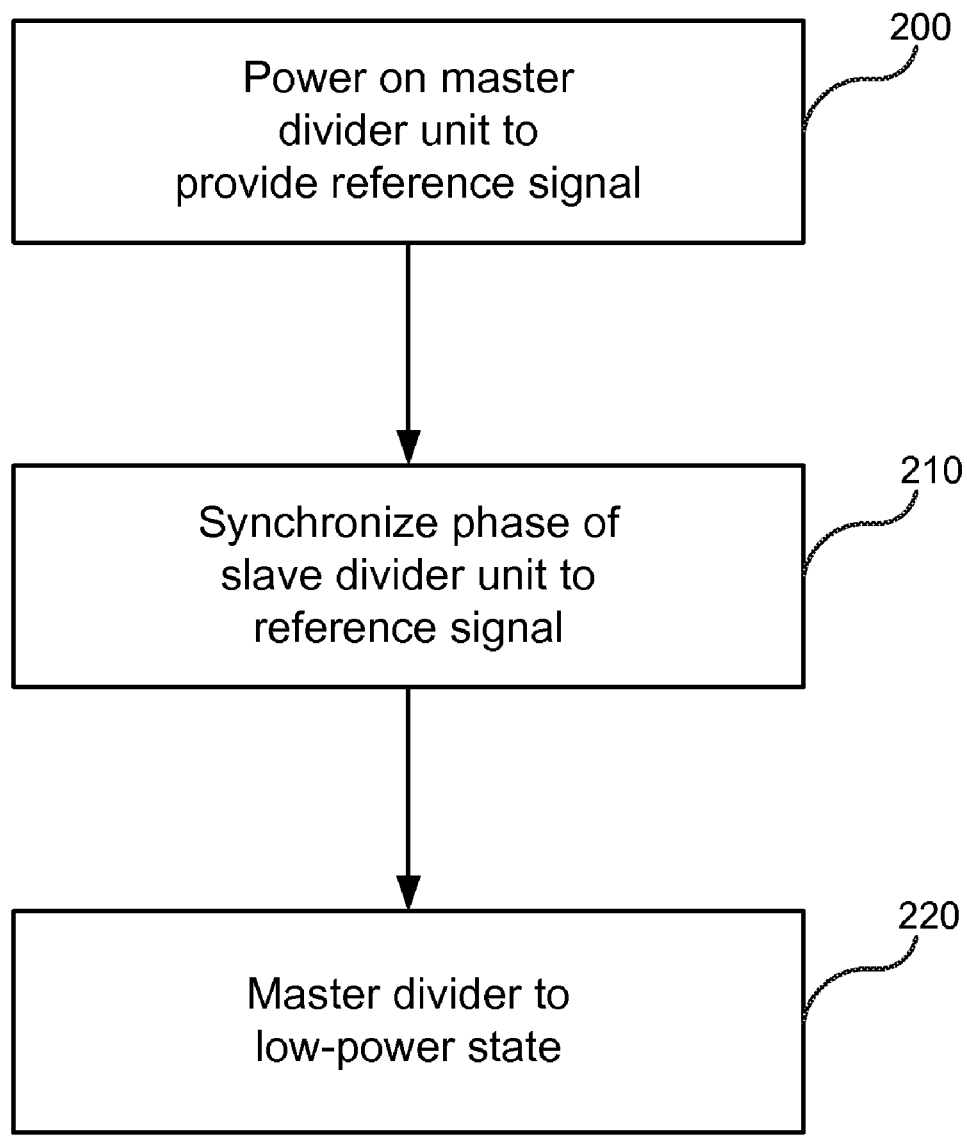
FIG. 2 is a flowchart showing a method for synchronizing phases of one or more divider units, according to certain aspects of the present disclosure.

FIG. 2 is a flowchart showing a method for synchronizing phases of one or more divider units, according to certain aspects of the present disclosure. At operation 200, the master divider 10 is powered on, thereby providing a reference signal to one or more of the slave divider units 20(0)-20(7). From operation 200, the process moves to operation 210, where the phase of at least one divider unit 20(0)-20(7) is synchronized to the reference signal generated by the master divider 10.

According to certain aspects, from operation 210, the process moves to operation 220 where the master divider 10 is turned to a low-power state after the one or more slave dividers 20(0)-20(7) are synchronized to the reference signal and have powered on to operate themselves in a self-feedback fashion.

Figure 3:
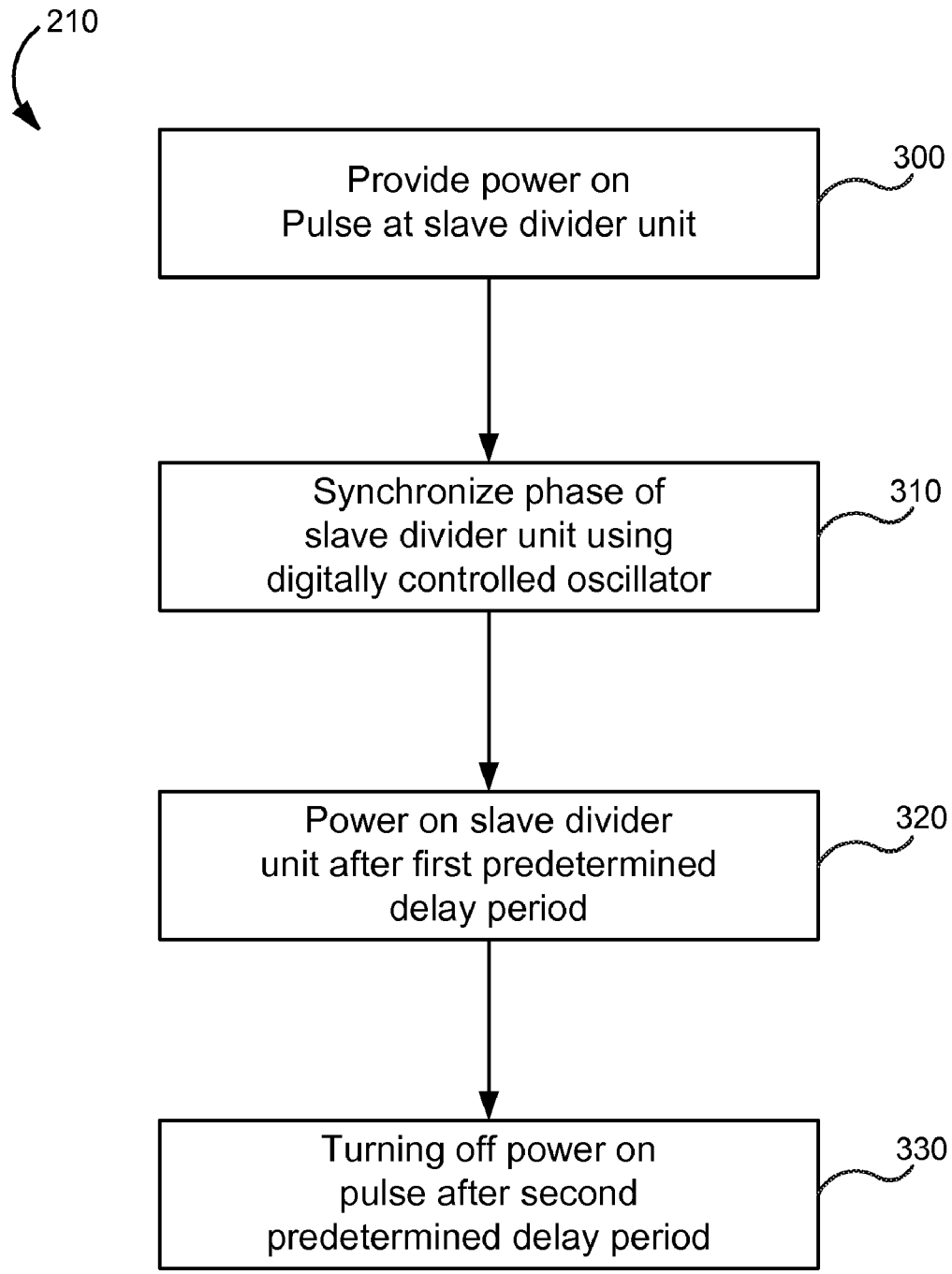
FIG. 3 is a flowchart showing a method for synchronizing a phase of a slave divider unit to a reference signal, according to certain aspects of the present disclosure.

FIG. 3 is a flowchart showing a method for synchronizing a phase of a slave divider unit to a reference signal as performed by operation 210 of FIG. 2, according to certain aspects of the present disclosure. FIG. 3 will be discussed below concurrently with FIG. 4, which is a graphical illustration of output power, a power on pulse and a delayed power on of a slave divider unit 20(0)-20(7), according to certain aspects of the present disclosure.

At operation 300, a power on pulse 410 (see FIG. 4) is applied the slave divider unit 20(0)-20(7). The power on pulse 410 may be initiated using any conventional method by a user (not shown) when operation of the particular slave divider unit 20(0)-20(7) is required.

From operation 300 the process moves to operation 310 where the phase of the slave divider unit 20(0)-20(7) is synchronized to the reference signal using the DCO 50. Synchronization using the DCO 50 will be explained in further detail with reference to FIGS. 5 and 6 below.

Figure 4:
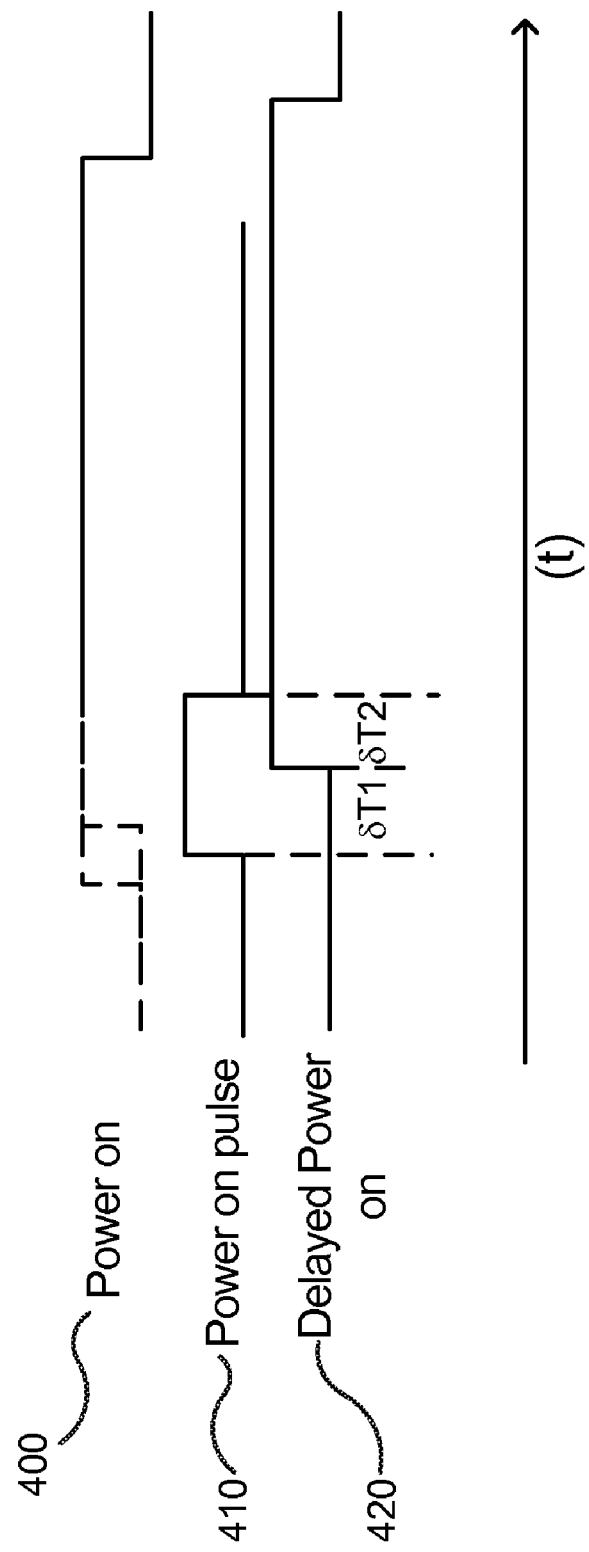
FIG. 4 is a graphical illustration of output power, a power on pulse and a delayed power on of a slave divider, according to certain aspects of the present disclosure.

From operation 310, the process moves to operation 320 where a delayed power on signal 420 (see FIG. 4) occurs at the slave divider unit 20(0)-20(7) after a first predetermined delay period δT1 (see FIG. 4). According to certain aspects, δT1 may be made as short as possible while still allowing enough time to power up all components of the slave divider unit 20(0)-20(7) to power up and for the phase of the slave divider unit 20(0)-20(7) to be synchronized to the reference signal. As an example, δT1 may be the time required for only 2 or 3 (or more) DCO 50 cycles. Of course, any sufficient δT1 may be implemented without departing from the scope of the present disclosure.

From operation 320, the process moves to operation 330 where the power on pulse 410 is gated off, for example, after a second predetermined delay period δT2 (see FIG. 4). δT2 is a buffer period where the power on pulse 410 overlaps with the delayed power on 420. This overlapping assures that the slave divider unit 20(0)-20(7) is fully powered on by its respective power control 30(0)-30(7) and operating in phase with the reference signal from the master divider 10. At this point, the master divider 10 may be turned to a low-power state to save power, since the slave divider unit 20(0)-20(7) will maintain its phase that is synchronized with the reference signal, using it self-feedback function. δT2 may be a few DCO 50 cycles to make sure a sufficient overlap is provided to make the master signal loop around the slave divider. For example, for a specific case of a divide-by-2 divider, a minimum of just 2 DCO 50 cycles may be enough for synchronization. This provides a very fast method of synchronization which is important in time-critical data applications. Of course, any sufficient δT2 may be implemented without departing from the scope of the present disclosure.

Figure 5:
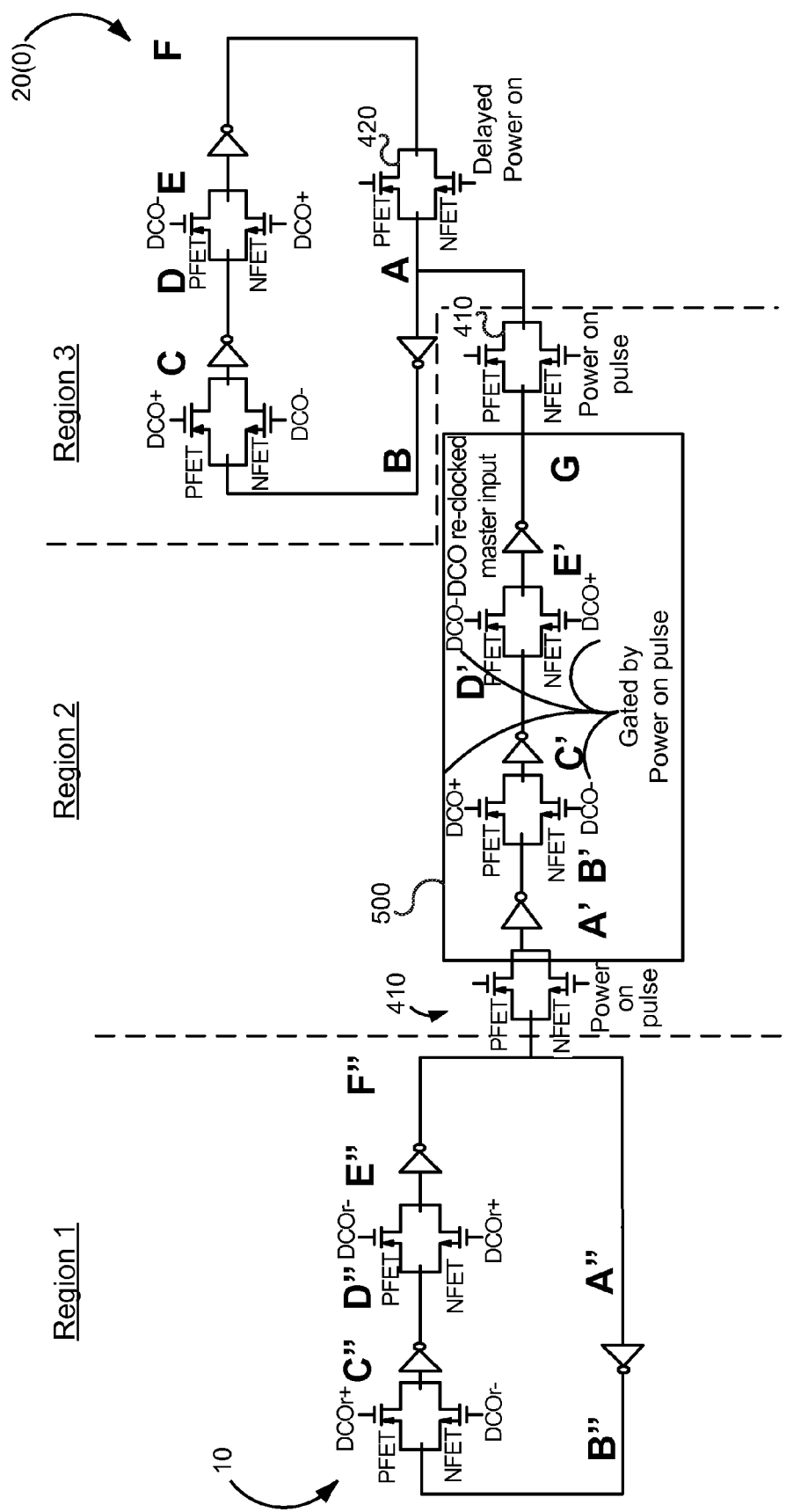
FIG. 5 is a schematic of a slave divider unit and a master divider unit, according to certain aspects of the present disclosure.

FIG. 5 is a schematic of an exemplary slave divider unit 20(0) and a master divider 10, according to certain aspects of the present disclosure. FIG. 5 shows a divide-by-2 example of a unit divider; however, one of ordinary skill in the art would understand that a unit divider capable of dividing the DCO 50 signal by any ratio (e.g., 2, 3, 4, 5, 6, etc.) could be designed and implemented similarly without departing from the scope of the present disclosure. FIG. 5 will be discussed concurrently with FIG. 6, which is a graphical illustration of phase synchronization of the slave divider unit 20(0), according to certain aspects of the present disclosure. It is noted that the examples shown in FIGS. 5 and 6 (as well as FIG. 7) illustrate a divide-by-2 divider. However, one skilled in the art would understand that similar techniques may be implemented to synchronize, for example, divide-by-4 (or any other divide ratio) dividers.

When master divider 10, in Region 1, is powered on (e.g., turned to a high-power state) and reference signal DCOr 50 is input, at point A" the signal is low with DCOr 50. The signal is high at point B" after passing through an inverter. Oscillating reference signal DCOr 50 offsets the signal at point C". After passing through an inverter, the signal is low at point D". DCOr causes the signal at point E" to be offset, and an inverter inverts the signal at point F" (which will be the same as point A"). This signal at point A" (F") will be the reference signal output from master divider 10.

FIG. 5 includes a gating feature 500 at Region 2, which is operated by power on pulse 410 to close a connection to the slave divider unit 20(0), thereby allowing reference signal G to be sent to the slave divider unit 20(0). The DCO 50 may be gated off after the power on pulse 410, according to certain aspects of the present disclosure. In Region 2, the master divider 10 output will be synchronized to the DCO 50. Thus, it is not necessary that the phase of reference signal DCOr 50 of Region 1 is the same as DCO 50 of Regions 2 and 3. Any offset in the master divider 10 will be corrected based on the DCO 50 in Region 2. Of course, gating feature 500 is only one example, and alternative gating features (or no gating feature) may be implemented without departing from the scope of the present disclosure.

When Region 2 is closed by power on pulse 410 (i.e., when a connection is closed to the slave divider unit 20(0)), the signal input from the master divider 10 at point A' passes through an inverter and is inverted at point B". Oscillating signal DCO 50 offsets the signal at point C", which is inverted at point D". Oscillating reference signal DCO 50 offsets the signal again at point E", which is inverted at point G". The signal at point G" is the reference signal to which the slave divider unit 20(0) will be ultimately synchronized at point F, for example (i.e., points F and G will be synchronized before the delayed power on 420 is executed.

Figure 6:
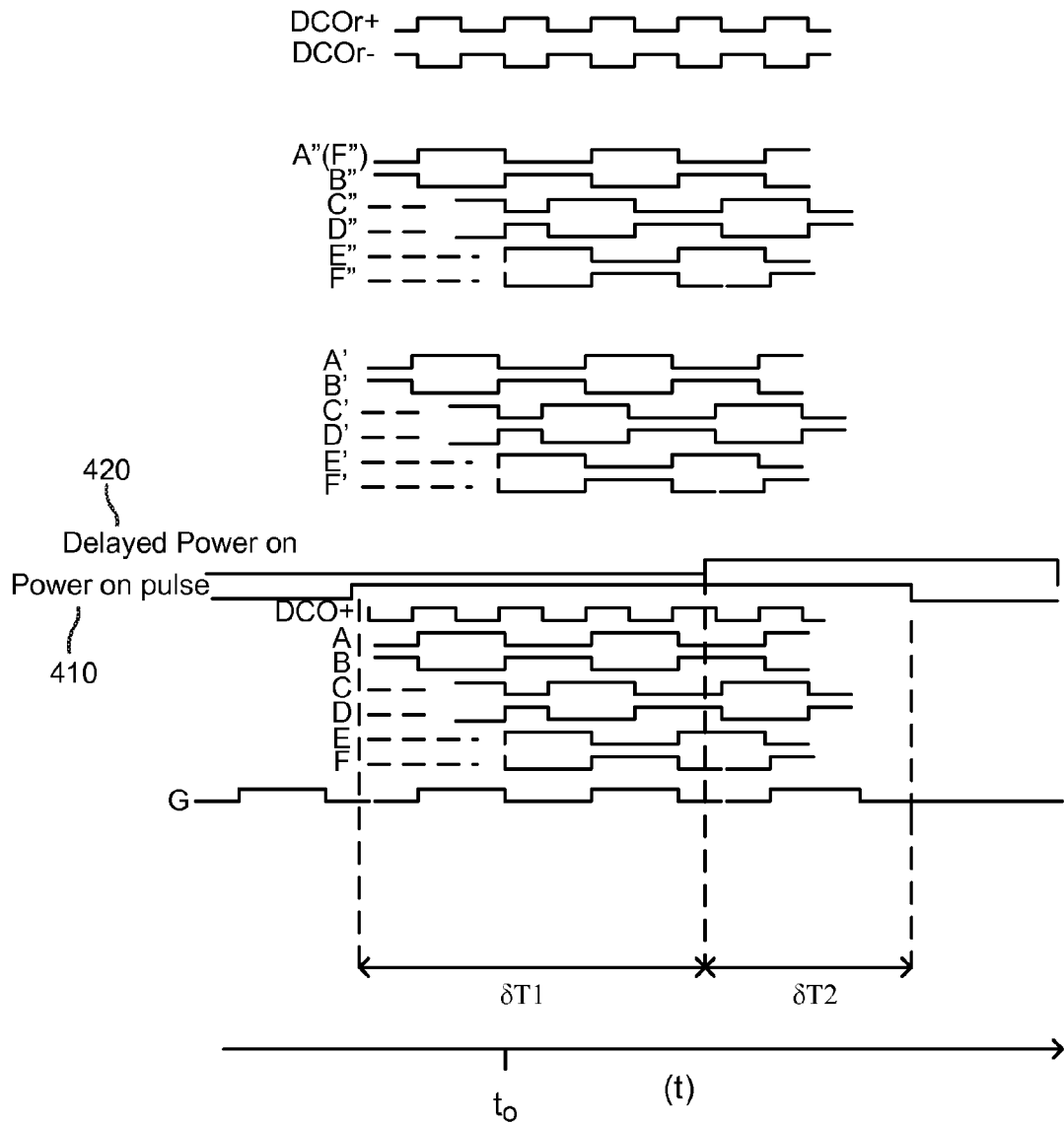
FIG. 6 is a graphical illustration of phase synchronization of a slave divider unit to a reference signal, according to certain aspects of the present disclosure.

As shown in the example of FIGS. 5 and 6, when the power on pulse 410 is provided to the slave divider unit 20(0), at Region 3, the signal at point G is input to the slave divider unit 20(a) at point A, where it is low, for example. The signal travels through an inverter, which causes the signal to be high at point B. Oscillating reference signal DCO 50 offsets the signal at point C, which then travels through an inverter, causing the signal to be low at point D. Finally, at point E the signal is offset again by DCO 50 and then travels through an inverter, which causes the signal to be low at point F. Of course, the foregoing describes one exemplary synchronization system using a master and a slave divider unit; however, other methods and systems may be implemented without departing from the scope of the claimed invention.

At time $t_0$, the signal at point F is synchronized with the reference signal G, which is within the first predetermined delay period $\delta T1$, at which time the delay power on signal 420 occurs at the slave divider unit 20(0). The power on pulse 410 may be gated off after $\delta T2$, since there is enough overlap to assure that the slave divider unit 20(0) is self-powered and operating in phase with the reference signal G from the master divider 10. The slave divider unit 20(0) will maintain its divider phase after the power on pulse 410 is gated off, until the slave divider unit 20(0) is powered off.

The preceding discussion relates to the synchronization of slave divider unit 20(0) to reference signal G, and a similar operation may be implemented for the other slave divider units 20(1)-20(7). As each slave divider unit 20(0)-20(7) synchronizes to the reference signal G, each slave divider unit 20(0)-20(7) is synchronized to each other as well, since the reference signal G is constant to all slave divider units 20(0)-20(7).

Figure 7:
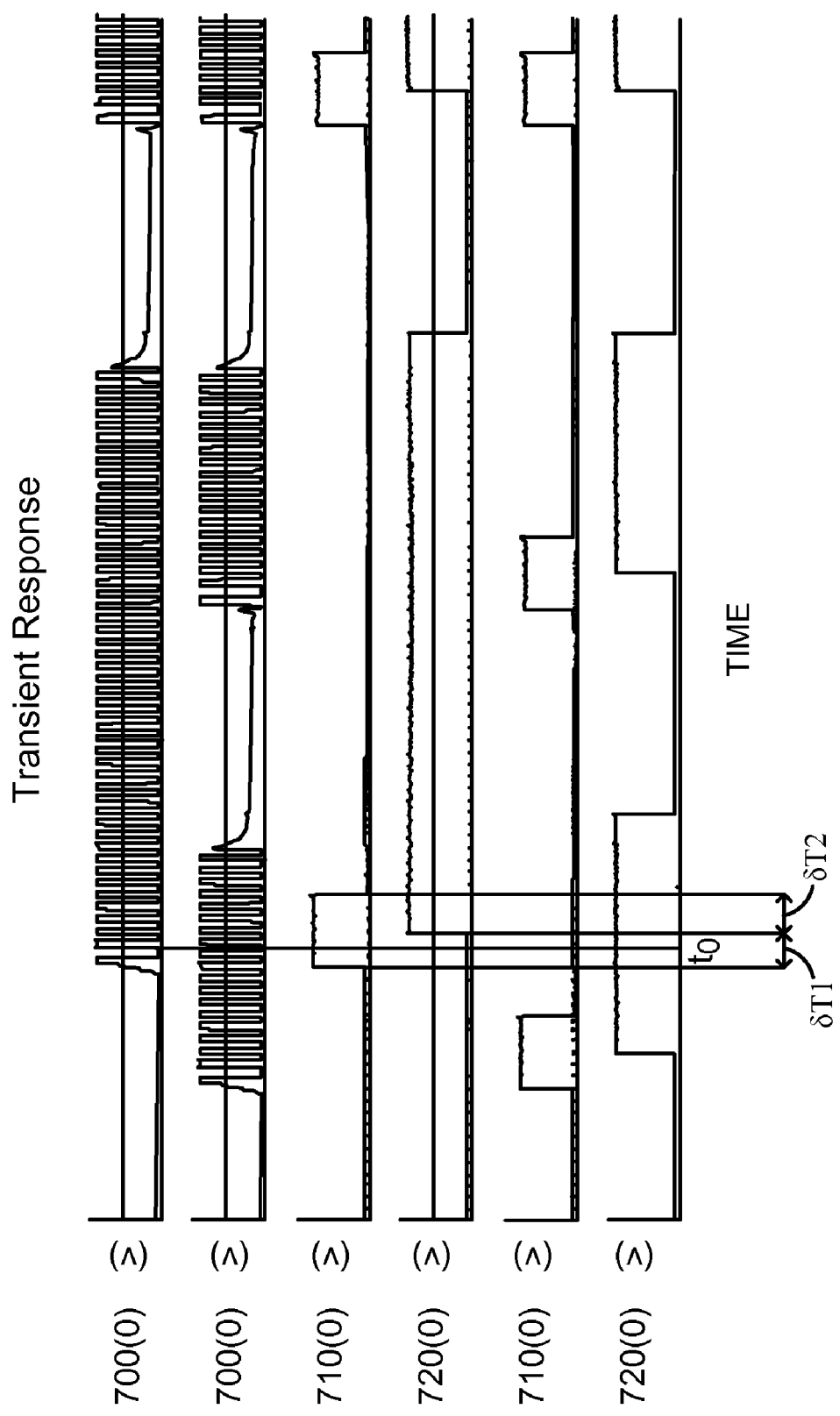
FIG. 7 is a transient response simulation plot of two slave divider units, according to certain aspects of the present disclosure.

FIG. 7 is a transient response simulation plot of two slave divider units 20(0) and 20(1), according to certain aspects of the present disclosure. Plots 700(0) and 700(1) show the transient response of two slave divider units 20(0) and 20(1), respectively. Of course, the present disclosure is not limited to any particular number of slave divider units, and two are show merely as an example.

A power on pulse 710(0) is provided at the first slave divider unit 20(0), and a power on pulse 710(1) is provided at the second slave divider unit 20(1). At time $t_0$, slave divider unit 20(0) will be synchronized with a reference signal from a master divider. It is noted that the first predetermined delay period $\delta T1$ extends at least as long as is necessary for the slave divider unit 20(0) to be synchronized. At the end of $\delta T1$, the delay power on 720(0) is executed for slave divider unit 20(0). A second predetermined time $\delta T2$ after the delay power on 720(0), the power on pulse 710(0) is gated off. Synchronization of the second slave divider unit 20(1) is performed similarly, using power on pulse 710(1) and delay power on 720(1).

Each delay power on 720(0) and 720(1) is high as long as a user requires the respective slave divider units 20(0) and 20(1) to operate. The process described herein will be repeated each time a user requires the operation of the respective slave divider units 20(0) and 20(1).

By synchronizing a slave divider unit to the reference signal from the master divider unit, any number of slave divider units may be powered on and in phase with each other. Further, using as a reference a low-power master divider, which may be powered off upon synchronization, little power consumption is required to synchronize the slave divider units.

Those of ordinary skill in the art would understand that the information and signal may be represented using any of a variety of different technologies and techniques. For example, data, instructions, commands information signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical modules, circuits and algorithms described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a filed programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional process, control, microcontroller, or state machine. A process may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes computer storage media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the disclosure. Thus, the present disclosure is not intended to be limited to the aspects shown herein but is to be accorded the widest scope consistent with the principles and novel features disclosed herein.

What is claimed is:

1. A method for synchronizing phases of one or more divider units, comprising:
    powering on a master divider unit to provide a reference signal; and
    synchronizing a phase of a slave divider unit to the reference signal from the master divider unit, wherein the synchronizing comprises:
        providing a power on pulse at the slave divider unit after the master divider unit is powered on to provide the reference signal;
        synchronizing the phase of the slave divider unit to the reference signal using a digitally controlled oscillator;
        powering on the slave divider unit after a first predetermined delay period following a rising edge of the power on pulse, wherein said powering on provides the slave divider unit with a sufficient voltage to operate; and
    turning the master divider unit to a low-power state after the synchronizing.

2. The method of claim 1, wherein a plurality of slave divider units exists, and the synchronizing is performed for one or more other of the plurality of slave divider units.

3. The method of claim 2, wherein one of the plurality of slave divider units is the master divider unit.

4. The method of claim 1, wherein the first predetermined delay period following the rising edge of the power on pulse is a time period required to power up all divider components of the slave divider unit and to synchronize the slave divider unit to the reference signal.

5. The method of claim 1, further comprising turning off the power on pulse after a second predetermined delay period, following the first predetermined delay period, to assure that the slave divider unit is powered on and synchronized to the reference signal.

6. The method of claim 1, wherein a plurality of slave divider units exist, and the providing a power on pulse, synchronizing the phase and powering on the slave divider are performed for one or more other of the plurality of slave divider units.

7. The method of claim 1, wherein the slave divider unit is a divide-by-2 divider unit.

8. The method of claim 1, wherein the slave divider unit is a divide-by-n divider unit, where n is an integer greater than 2.

9. An apparatus for synchronizing phases of one or more divider units, comprising:
    a master divider unit providing a reference signal;
    a slave divider unit synchronizing a phase thereof to the reference signal from the master divider unit;
    a power source providing a power on pulse at the slave divider unit after the master divider unit is powered on;
    a digitally controlled oscillator synchronizing the phase of the slave divider unit to the reference signal;
    a power source powering on the slave divider unit after a first predetermined delay period following a rising edge of the power on pulse, wherein the power source provides the slave divider unit with a sufficient voltage to operate; and
    a power source turning the master divider unit to a low-power state after the synchronizing.

10. The apparatus of claim 9, wherein a plurality of slave divider units exists, and one or more other of the plurality of slave divider units synchronizes a phase thereof to the reference signal from the master divider unit.

11. The apparatus of claim 10, wherein one of the plurality of slave divider units is the master divider unit.

12. The apparatus of claim 9, wherein the first predetermined delay period following the rising edge of the power on pulse is a time period required to power up all divider components of the slave divider unit and to synchronize the slave divider unit to the reference signal.

13. The apparatus of claim 9, wherein the power on pulse is turned off after a second predetermined delay period, following the first predetermined delay period, to assure that the slave divider unit is powered on and synchronized to the reference signal.

14. The apparatus of claim 9, wherein a plurality of slave divider units exist, and one or more other of the plurality of slave divider units synchronizes a phase thereof to the reference signal from the master divider unit.

15. The apparatus of claim 9, wherein the slave divider unit is a divide-by-2 divider unit.

16. The apparatus of claim 9, wherein the slave divider unit is a divide-by-n divider unit, where n is an integer greater than 2.

17. An apparatus for synchronizing phases of one or more divider units, comprising:
    means for powering on a master divider unit to provide a reference signal; and
    means for synchronizing a phase of a slave divider unit to the reference signal from the master divider unit, wherein the means for synchronizing comprises:
        means for providing a power on pulse at the slave divider unit after the master divider unit is powered on to provide the reference signal;
        means for synchronizing the phase of the slave divider unit to the reference signal using a digitally controlled oscillator;

means for powering on the slave divider unit after a first predetermined delay period following a rising edge of the power on pulse, wherein said means for powering on provides the slave divider unit with a sufficient voltage to operate; and means for turning the master divider unit to a low-power state after the synchronizing.

18. The apparatus of claim 17, wherein a plurality of slave divider units exists, and the means for synchronizing is implemented for one or more other of the plurality of slave divider units.

19. The apparatus of claim 18, wherein one of the plurality of slave divider units is the master divider unit.

20. The apparatus of claim 17, wherein the first predetermined delay period following the rising edge of the power on pulse is a time period required to power up all divider components of the slave divider unit and to synchronize the slave divider unit to the reference signal.

21. The apparatus of claim 17, further comprising means for turning off the power on pulse after a second predetermined delay period, following the first predetermined delay period, to assure that the slave divider unit is powered on and synchronized to the reference signal.

22. The apparatus of claim 17, wherein a plurality of slave divider units exist, and the means for providing a power on pulse, means for synchronizing the phase and means for powering on the slave divider are implemented for one or more other of the plurality of slave divider units.

23. The apparatus of claim 17, wherein the slave divider unit is a divide-by-2 divider unit.

24. The apparatus of claim 17, wherein the slave divider unit is a divide-by-n divider unit, where n is an integer greater than 2.

25. A computer-readable medium storing instructions thereon for performing a method of synchronizing phases of one or more divider units, comprising:

powering on a master divider unit to provide a reference signal; and synchronizing a phase of a slave divider unit to the reference signal from the master divider unit, wherein the synchronizing comprises:

providing a power on pulse at the slave divider unit after the master divider unit is powered on to provide the reference signal;

synchronizing the phase of the slave divider unit to the reference signal using a digitally controlled oscillator;

powering on the slave divider unit after a first predetermined delay period following a rising edge of the power on pulse, wherein said powering on provides the slave divider unit with a sufficient voltage to operate; and turning the master divider unit to a low-power state after the synchronizing.

26. The computer-readable medium of claim 25, wherein a plurality of slave divider units exists, and the synchronizing is performed for one or more other of the plurality of slave divider units.

27. The computer-readable medium of claim 26, wherein one of the plurality of slave divider units is the master divider unit.

28. The computer-readable medium of claim 25, wherein the first predetermined delay period following the rising edge of the power on pulse is a time period required to power up all divider components of the slave divider unit and to synchronize the slave divider unit to the reference signal.

29. The computer-readable medium of claim 25, further comprising turning off the power on pulse after a second predetermined delay period, following the first predetermined delay period, to assure that the slave divider unit is powered on and synchronized to the reference signal.

30. The computer-readable medium of claim 25, wherein a plurality of slave divider units exist, and the providing a power on pulse, synchronizing the phase and powering on the slave divider are performed for one or more other of the plurality of slave divider units.

31. The computer-readable medium of claim 25, wherein the slave divider unit is a divide-by-2 divider unit.

32. The computer-readable medium of claim 25, wherein the slave divider unit is a divide-by-n divider unit, where n is an integer greater than 2.

* * * * *